United States Patent [19]

Hansen

[11] Patent Number: 4,667,468
[45] Date of Patent: May 26, 1987

[54] ROTARY INTERNAL COMBUSTION ENGINE

[75] Inventor: Craig N. Hansen, Minnetonka, Minn.

[73] Assignee: Hansen Engine Corporation, Minnetonka, Minn.

[21] Appl. No.: 715,523

[22] Filed: Mar. 25, 1985

[51] Int. Cl.[4] .............................................. F02C 3/00
[52] U.S. Cl. .................................... 60/39.6; 123/248
[58] Field of Search ...................... 123/236, 237, 248; 418/221; 60/39.6

[56] References Cited

U.S. PATENT DOCUMENTS

| | | | |
|---|---|---|---|
| 672,432 | 4/1901 | Sterba | 123/248 |
| 1,001,533 | 8/1911 | Kinney . | |
| 1,145,627 | 7/1915 | Stradousky | 123/248 |
| 1,242,692 | 10/1917 | Hibner . | |
| 1,424,977 | 8/1922 | Bidwell | 418/221 |
| 1,767,985 | 6/1930 | Johnson . | |
| 2,061,049 | 11/1936 | Spellman . | |
| 2,250,484 | 7/1941 | Jutting | 123/248 |
| 2,294,647 | 9/1942 | Ames . | |
| 2,382,591 | 8/1945 | Warren . | |
| 2,636,480 | 4/1953 | Becker . | |
| 3,160,147 | 12/1964 | Hanson . | |
| 3,555,814 | 1/1971 | Morsell | 60/39.6 |
| 3,568,645 | 3/1971 | Grimm . | |
| 3,572,030 | 3/1971 | Cuff . | |
| 3,727,589 | 4/1973 | Scott . | |
| 3,782,867 | 1/1974 | Gerlach et al. . | |
| 3,791,352 | 2/1974 | Takacs . | |
| 3,797,464 | 3/1974 | Abbey . | |
| 3,904,327 | 9/1975 | Edwards et al. . | |
| 3,951,111 | 4/1976 | Lester . | |
| 4,018,191 | 4/1977 | Lloyd . | |
| 4,033,507 | 7/1977 | Fromel et al. . | |
| 4,055,156 | 10/1977 | Salguero . | |
| 4,088,426 | 9/1978 | Edwards . | |
| 4,263,880 | 4/1981 | Keeton . | |
| 4,266,516 | 5/1981 | Hakner . | |
| 4,299,097 | 11/1981 | Shank et al. . | |
| 4,507,067 | 3/1985 | Hansen | 418/221 |

FOREIGN PATENT DOCUMENTS 2439796 3/1976 Fed. Rep. of Germany ....... 60/39.6

Primary Examiner—Douglas Hart
Attorney, Agent, or Firm—Burd, Bartz & Gutenkauf

[57] ABSTRACT

A rotary internal combustion engine has a housing with an elliptical inside surface surrounding an elliptical rotor forming with the housing combustion chambers. Valve and ignition assemblies connected to a source of air under pressure and injectors for introducing fuel into the air supply sequentially allows the air and fuel mixture to flow into the combustion chambers and ignite the air and fuel mixture therein. Vane and seal assemblies on the rotor and housing are controlled with cam and linkages to provide positive effective gas seals between the housing and rotor. A slack adjuster maintains lateral sealing relationships between the housing vane and seal assemblies and opposite side walls of the housing.

44 Claims, 23 Drawing Figures

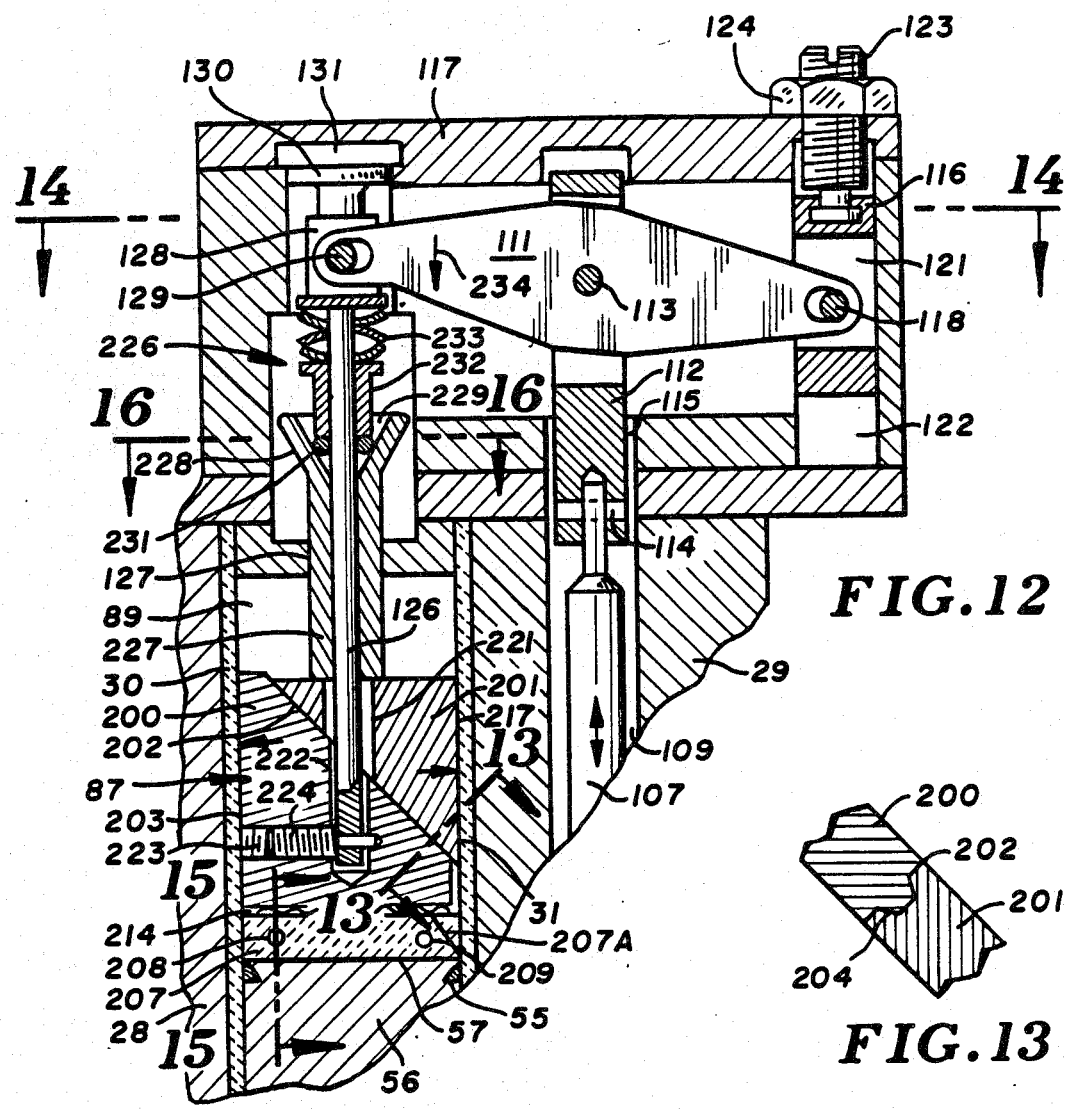
FIG.12
FIG.13
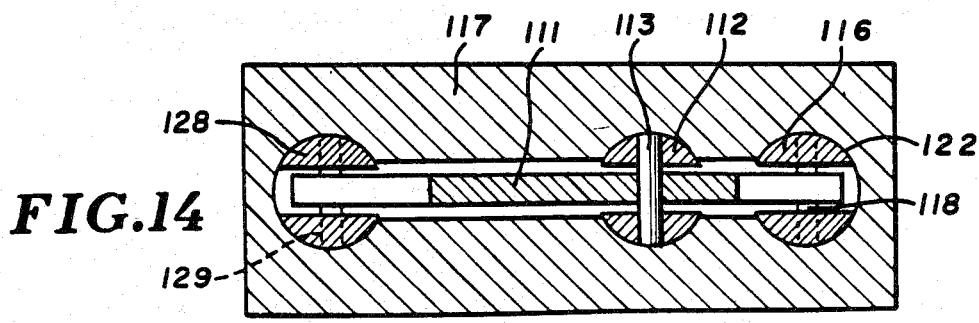
FIG.14

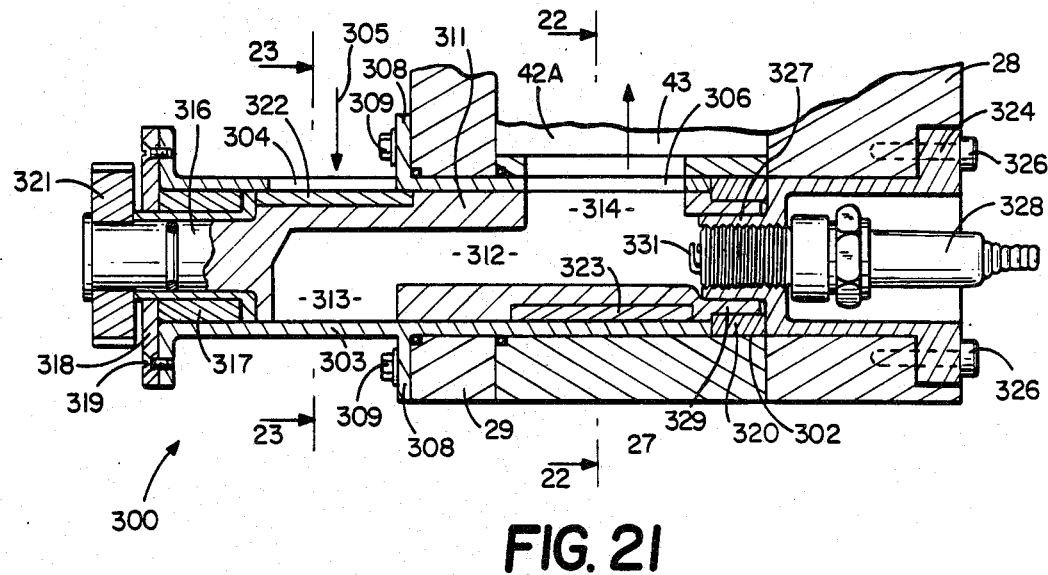
FIG. 21
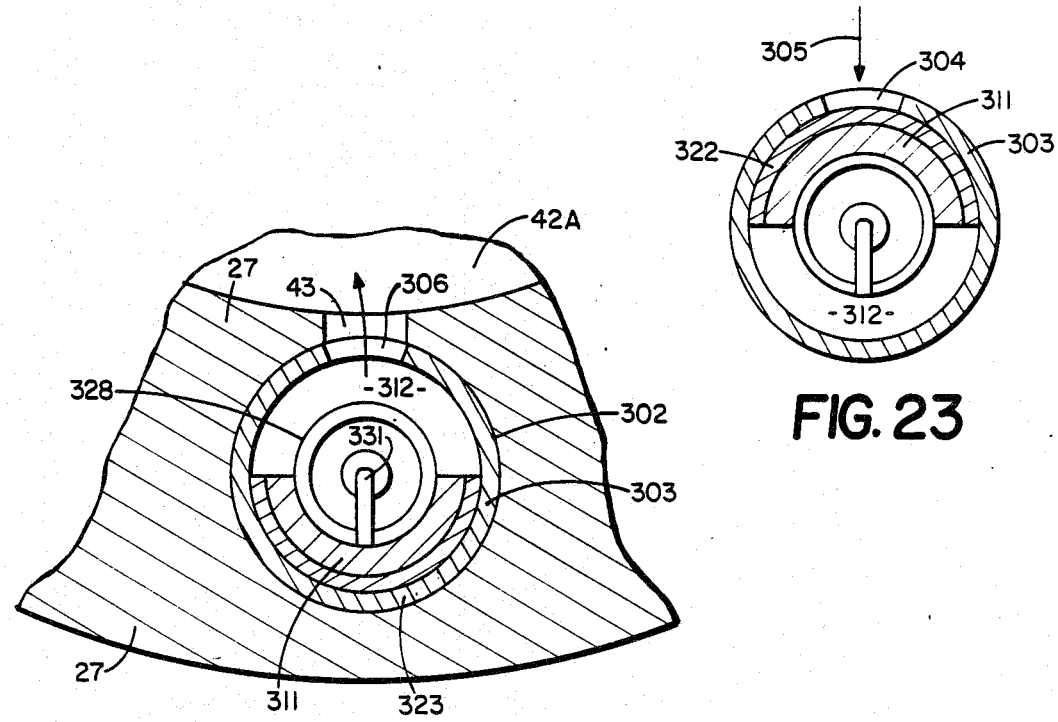
FIG. 23
FIG. 22

4,667,468

ROTARY INTERNAL COMBUSTION ENGINE

FIELD OF INVENTION

The invention is directed to the field of rotary internal combustion engines of the type having a housing with a combustion chamber accommodating a rotor.

BACKGROUND OF INVENTION

Rotary engines have housings that include chambers accommodating rotating rotors are disclosed by Lloyd in U.S. Pat. No. 4,018,191. A plurality of vanes movably mounted on the rotors function to move and compress an air and hydrocarbon fuel mixture in the chambers in response to rotation of the rotors. It is conventional practice to utilize springs to continuously bias the vanes into engagement with surfaces, such as the inside walls of housings forming chambers accommodating the rotors. Examples of rotary devices having spring-biased vanes associated with the rotors are shown in U.S. Pat. Nos. 1,242,692, 1,424,977 and 3,572,030. Rotary engines having spring-biased vanes movably mounted on the rotors have limited operating speeds. Centrifugal forces cause the vanes to move into frictional contact with the inside walls of the housings provided the chambers for the rotors. This frictional contact causes wear of the vanes and inside walls of the housings resulting in gas leakage past the vanes and excessive mechanial losses.

Rotary vane-type devices have been designed to positively position the vanes during the rotation of the rotors relative to the housings of the devices. The positive positioning of the vanes is achieved through rollers located within continuous cam tracks. Shank et al. shows, in U.S. Pat. No. 4,299,047, a vane-type rotary device having a rotor with a plurality of vanes. Rollers located in tracks positively control the location of the vanes during the rotation of the rotor.

SUMMARY OF INVENTION

The invention relates to a rotary combustion engine having a housing with an inside surface surrounding a combustion chamber accommodating a rotor. The rotor is rotatably mounted on the housing and divides the chamber into a plurality of combustion chambers. The rotor has a plurality of vane and seal assemblies located in sliding sealing engagement with the inside surface of the housing. First means operably associated with the rotor vane and seal assemblies control the positions thereof and the sealing action during rotation of the rotor and combustion of fuel in the combustion chambers. A plurality of housing vane and seal assemblies movably mounted on the housing are retained in operative sealing relation with the outer surface of the rotor with a second cam means. The second means reciprocates the housing vane and seal assemblies in response to rotation of the rotor to maintain an effective gas sliding seal between the rotor and the housing vane and seal assemblies. The rotary device has positive control of both the rotor and housing vane and seal assemblies to provide effective sliding gas seals between the stationary housing and the rotating rotor. The positive control of the sealing relation of the rotor and housing vane and seal assemblies results in a minimum of wear of the structural parts, increased gas sealing efficiencies and with minimal mechanical losses. The shapes of the housing and the rotor are relatively easy to machine and fabricate, and provide efficient burning of an air and fuel mixture in the combustion chambers. Valve and ignition assemblies are operable to control the intake of an air and fuel mixture in the combustion chambers and the ignition of the fuel. The valve and ignition assemblies receive air under pressure from an external source, such as an air compressor. Fuel introducing means, such as fuel injectors or a carburetor are used to introduce controlled amounts of fuel, such as gasoline, into the air flowing to the air compressor. The fuel is mixed with the air to provide a selected air, i.e. 15 to 1 fuel ratio to optimize the efficiency of the engine. The housing has exhaust ports to carry exhaust gases from the combustion chambers.

According to the invention, there is provided a rotary internal combustion engine having a housing means with an inside surface surrounding a chamber. The housing means has intake port means and exhaust port means allowing an air and fuel mixture to flow into and exhaust gases to discharge from combustion chambers formed by the rotor means. A rotor means rotatably mounted on the housing means is located in the chamber space surrounded by the inside surface of the housing means. A plurality of first vane means movably mounted on the rotor means provides a fluid seal with the inside surface of the housing means. A first cam means operates to move the first vane means to sealing contiguous relation with the inside surface of the housing means during rotation of the rotor means. Second vane means movably mounted on the housing means engage the rotor means and separate the intake port means from the exhaust port means. The first and second means each have a seal member movably mounted on this free end thereof. Biasing means engageable with the seal members biases the seal members into contiguous sealing relative with the adjacent surfaces. Second cam means are operable to move the second vane means to gas sealing relation with said rotor means whereby on rotation of the rotor means an air and fluid mixture flows into the chambers through the intake port means and exhaust gases are discharged under pressure from the compression chambers through the exhaust port means. Valve and ignition assemblies are used to control the flow of a gas and fuel mixture into the combustion chambers. Each valve and ignition assembly has a rotary valve that is rotated in timed relation with respect to the rotation of the rotor means. An igniter incorporated into the assembly operates to ignite the air and fuel mixture in the assembly. The fuel burns and expands in the combustion chamber. The air under pressure is supplied to the valve and ignition assemblies. This air is derived from an air compressor drivably connected to one end of shaft of the internal combustion engine. Hydrocarbon fuel, such as gasoline, alcohol, and the like, is introduced with an injector into the air under pressure flowing to the air compressor or may be introduced to the air in the valve and ignition assemblies. The mixture of air and fuel is adjusted to provide optimum operating characteristics of the engine.

A particular embodiment of the rotary internal combustion engine comprises a housing means provided with an elliptical inside surface surrounding an elliptical volume separated into four chambers. The housing means has fuel and air intake port means open to opposite chambers adjacent the minor axis thereof and exhaust gas exhaust port means open to the other opposite chambers adjacent the minor axis thereof. A pair of valve and ignition assemblies mounted on the housing functions to control the flow of an air fuel mixture in a timed relation into a pair of chambers commencing from each intake port means. Each valve and ignition assembly has a rotating valve that is driven in timed relation with the rotor. This is done with gears or a synchronous motor. The motor is coupled to a valve and ignition control having a computer and pulse generator which controls the operation of the valve and ignition assembly in a timed relation to the rotation of the drive shaft of the internal combustion engine. Air under pressure from an external source, such as an air compressor, is continuously delivered to each of the valve and ignition assemblies. Fuel injectors are used to introduce a fine spray of liquid fuel into the compressed air moving to the intake ports of the air compressor. The introduction of the fuel into the air can be electronically controlled with an appropriate control, such as a programmable microcomputer and pulse generator to provide an air/fuel ratio that provides for optimum operating efficiency of the internal combustion engine. The exhaust gas port means is separated from the intake port means. An elliptical rotor means is located in the elliptical volume. The elliptical rotor means has a major axis extended along the mid-sections of opposite ends of the rotor means. Shaft means rotatably mounted on the housing means locate the rotor means in chambers. First vane means are movably mounted on the major axis opposite ends of the rotor means. The first vane means have seal means located in gas sealing relation relative to the inside elliptical surface of the housing means. Biasing means associated with the seal means retains the seal means in contiguous sealing relation with the inside elliptical surface of the housing means. A first cam means is operably connected to the first vane means for moving the first vane means relative to the rotor means during rotation of the rotor means in a manner to maintain the seal means of the first vane means in gas sealing relation relative to the inside surface of the housing means. Second vane means are movably mounted on the housing means between the intake port means and exhaust port means and extend into the chamber. The first and second vane means separate the chambers into gas intake chambers and gas compression and exhaust chambers. The second vane means have seal means locatable in gas sealing relation relative to the outer elliptical surface of the rotor means. Biasing means located in operative relation with the seal means biases the second seal means in contiguous sealing relation relative to the outer elliptical surface of the rotor means. A second cam means connected to the second vane means operates to move the second vane means in response to rotation of the rotor means to provide an effective sliding seal between the second vane means and the outer elliptical surface of the rotor means.

The first cam means includes means having generally oval-shaped track means mounted on the housing means. Cam follower means located in the track means is connected to the first vane means so that movement of the first vane means relative to the rotor means is determined by the shape of the track means. The oval-shaped track means has major and minor axes that coincide with the major and minor axes of the elliptical inside surface of the housing. The second cam means includes means mounted on the shaft means having general oval second track means and second cam follower means cooperating with the second track means. Motion transmitting means connect the second cam follower means to the movable second vane means so that, on rotation of the shaft means, the second track means rotates thereby moving the second cam follower means and motion transmitting means to effect the movement of the second vane means. The motion transmitting means includes a rocker arm and link means for transmitting the oscillating movement of the second cam means caused by the rotating second track means to reciprocate movement of the second vane means. The motion transmitting means has adjustment means for adjusting the contiguous relationship between the seal means of the second vane means and the elliptical surface of the rotor means to maintain an effective gas seal during rotation of the rotor means.

The first and second vane means comprise first and second vane segments that cooperate with each other to provide sliding sealing contact with adjacent side walls of the housing. The outer vane segment has a transverse seal member located in sealing engagement with an elliptical surface of the housing or rotor. The seal member can be a ceramic member that is biased with the pressure of the compressed gas into sealing relation with its adjacent elliptical surface. Slack adjusting means is incorporated into the motion transmitting means connecting the second vane means to the second track means. The slack adjusting means includes a rod that is linearly adjustable to maintain the vane segments in sealing relation with respect to the side walls of the housing and the transverse seal in sealing relation with its adjacent elliptical surface.

DESCRIPTION OF DRAWING

FIG. 12 is an enlarged sectional view of the housing vane and seal assembly and power transmitting linkage therefor, as shown in FIG. 11;

FIG. 13 is an enlarged sectional view taken along line 13—13 of FIG. 12;

FIG. 14 is a sectional view taken along line 14—14 of FIG. 12;

FIG. 21 is an enlarged sectional view taken along line 21—21 of FIG. 1;

FIG. 22 is a sectional view taken along line 22—22 of FIG. 21; and

FIG. 23 is a sectional view taken along line 23—23 of FIG. 21.

DESCRIPTION OF PREFERRED EMBODIMENT

Figure 1:
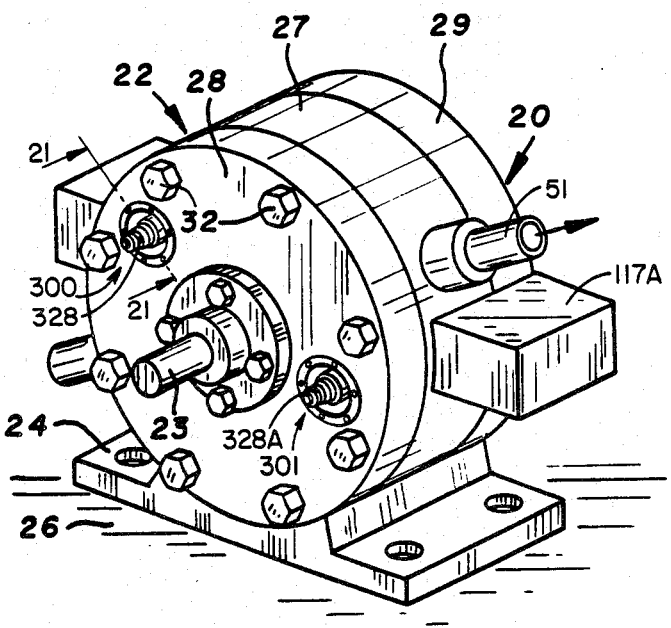
FIG. 1 is a perspective view of the rotary internal combustion engine and valve and ignition control therefor of the invention.
Figure 2:
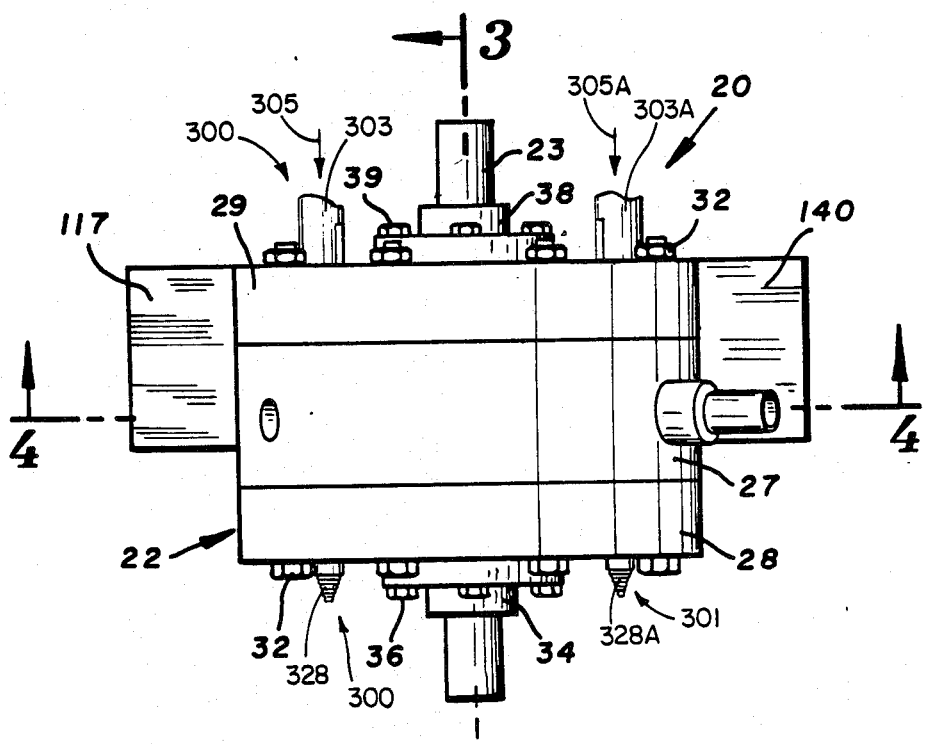
FIG. 2 is an enlarged top view of the rotary internal combustion engine of FIG. 1.

Referring to FIGS. 1 and 2, there is shown the rotary internal combustion engine of the invention indicated generally at 20. Engine 20 burns hydrocarbon fuel, such as gasoline, alcohol, and a mixture of gasoline and alcohol in an efficient manner. Other combustible fuels including hydrogen can be used with engine 20.

Engine 20 has a cylindrical housing 22 rotatably supporting a shaft 23. Housing 22 is located on a base 24 attached to a support 26. Housing 22 has a cylindrical body 27 secured to a first end plate 28 and a second end plate 29 with a plurality of nut and bolt assemblies 32. The inside surfaces of end plates 28 and 29 are covered with layers of coatings of ceramic material 30 and 31. The ceramic material has a low coefficient of expansion, is wear-resistant, and requires a minimum of lubrication to maintain a fluid seal with the adjacent rotary structure. Examples of suitable ceramic materials are silicon nitride, silicon carbide, and other ceramic compositions including silicon, aluminum, oxygen, nitrogen, and other materials. The layers of ceramic material 30 and 31 are applied to the metal of the end plates by any suitable process. The material of plates 28 and 29 can be ceramic materials.

Figure 3:
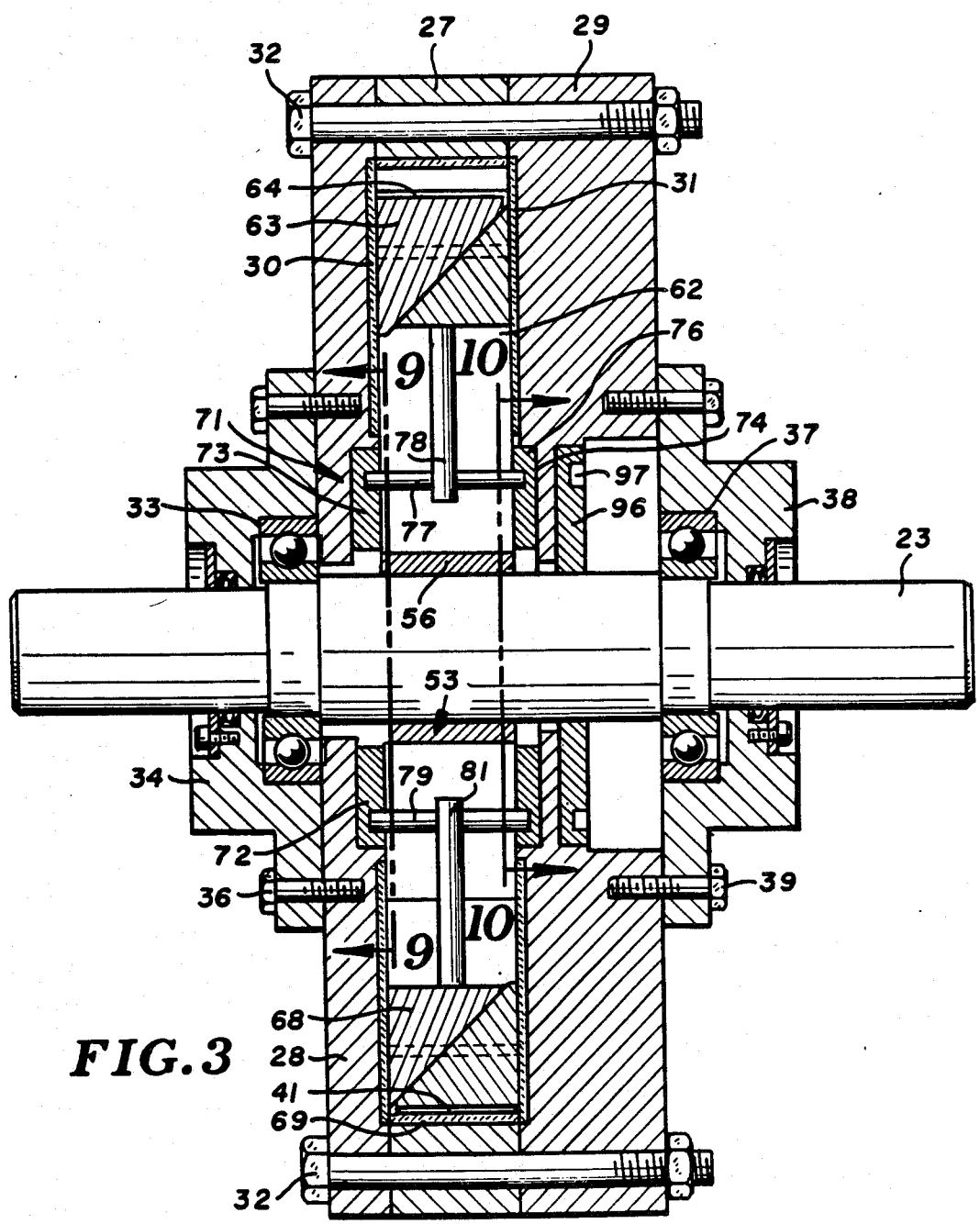
FIG. 3 is an enlarged sectional view taken along the line 3—3 of FIG. 2.

As shown in FIG. 3, shaft 23 is rotatably supported on bearings 33 and 37. A bearing cap 34 accommodates bearing 33 and is secured to end plate 28 with a plurality of bolts 36. A bearing cap 38 accommodates bearing 37. A plurality of bolts 39 secures bearing cap 38 to end plate 31.

Figure 4:
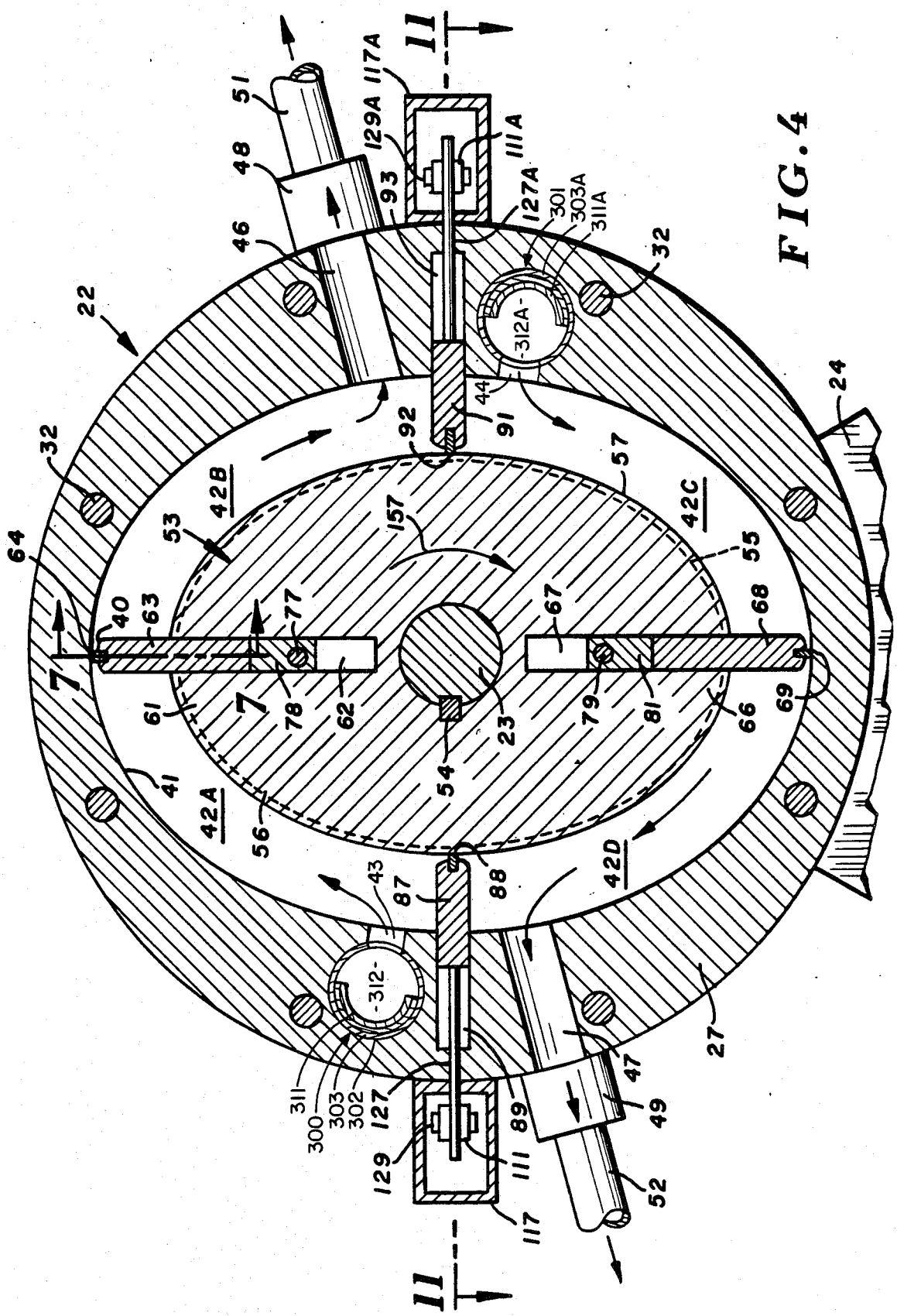
FIG. 4 is an enlarged sectional view taken along the line 4—4 of FIG. 2.

Body 27 has an elliptical inside wall 41 surrounding an elliptical volume divided into the four chambers 42A, 42B, 42C, and 42D. Wall 41 has uniform width, a vertical major axis and a horizontal minor axis, as shown in FIG. 4. The orientation of body 27 can be changed to alter the orientation of the major and minor axes of elliptical inside wall 41. Body 27 has a pair of inlet ports 43 and 44 in opposite portions thereof near the mid-section of the minor axis of chamber 42. Ports 43 and 44 are open to chamber 42, whereby an air and fuel mixture can flow into opposite portions of chamber 42, as shown by the arrows.

Body 27 has a pair of exhaust gas outlet ports 46 and 47 located in opposite portions of body 27 adjacent inlet ports 43 and 44. Ports 46 and 47 are open to a portion of the minor axis of chamber 42 and lead to an exhaust gas manifold 51 and 52 or mufflers (not shown).

Figure 11:
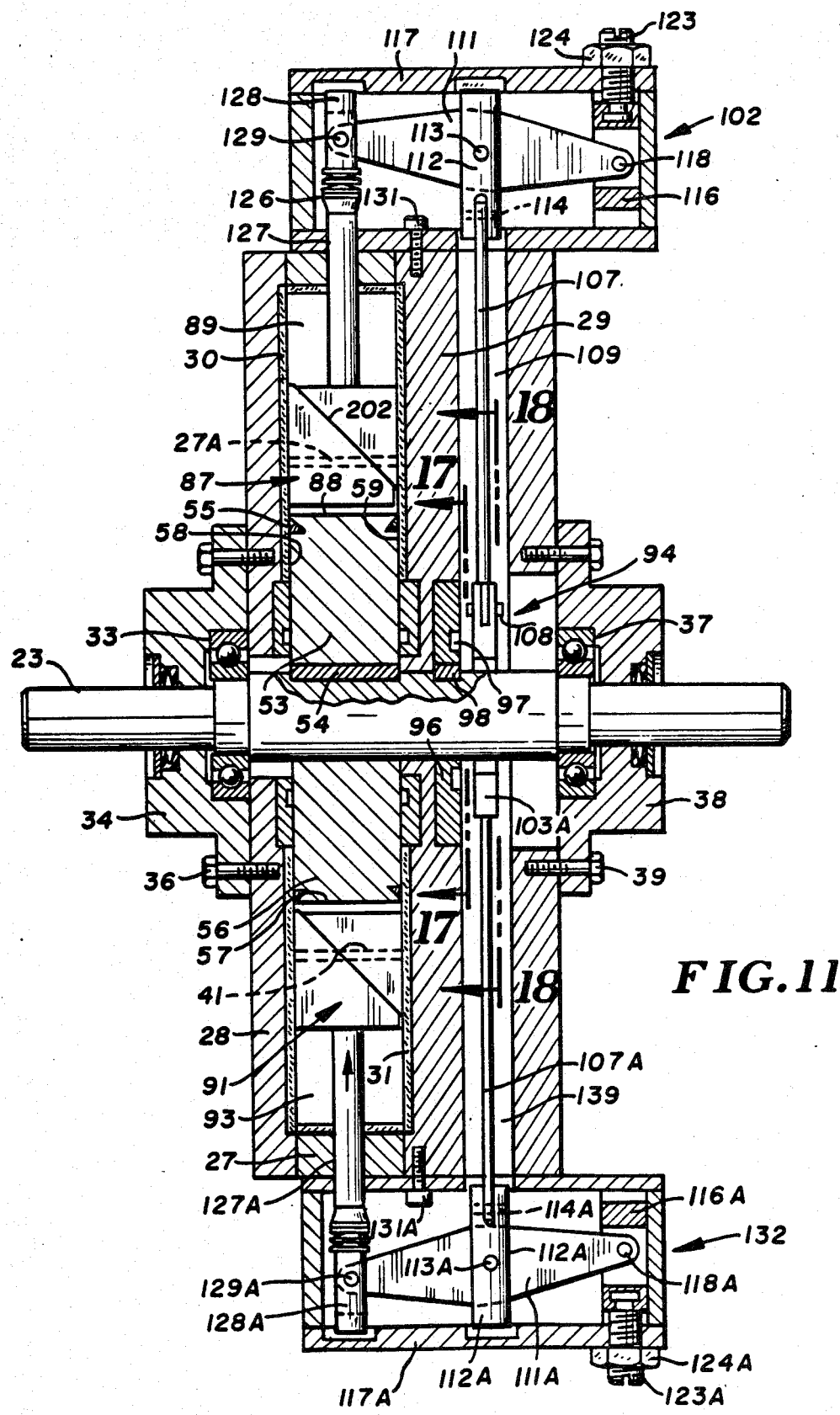
FIG. 11 is a sectional view taken along the line 11—11 of FIG. 4.

As shown in FIG. 4, a rotor indicated generally at 53 located within chamber 42 is drivably mounted on shaft 23 and secured thereto with a key 54. Rotor 53 has an elliptical rotor member 56 having a center hole accommodating shaft 23 and key 54. Member 56 has an elliptical outer surface 57 having a major axis equal to the minor axis of chamber 42 and a minor horizontal axis equal to or less than the minor diameter of elliptical chamber 42. The outer surface 57 of rotor member 56 has an elliptical outline that has the same general elliptical shape or the elliptical outline of inside wall 41. The major axis of elliptical inside wall 41 is substantially greater than the major diameter of the elliptical outer surface 57 of rotor member 56. As shown in FIG. 11, member 56 has opposite generally flat side walls 58 and 59. Side wall 58 is located in sliding sealing engagement with the inside surface of ceramic coating 30 on end plate 28. Side wall 59 is located in sliding sealling engagement with the inside surface of ceramic coating 31 on end plate 29. As shown in FIGS. 4 and 11, perimeter seals 55 mounted on the outer arcuate sections of the sides of rotor member 56 prevent gas from flowing around the sides of the rotor member. Seals 55 engage ceramic coatings 30 and 31.

Figure 5:
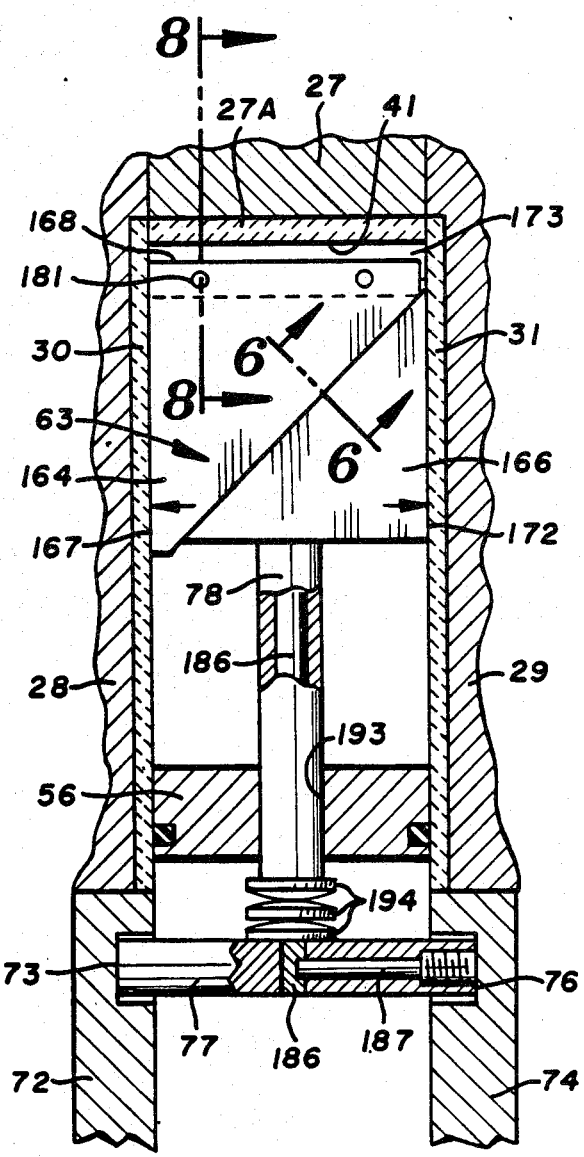
FIG. 5 is an enlarged sectional view of the vane and seal assembly shown in FIG. 3.
Figure 6:
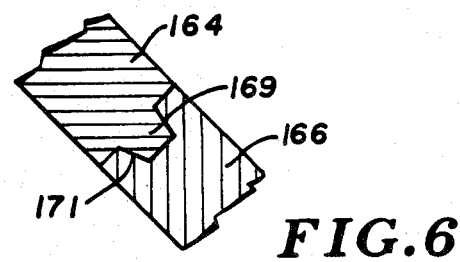
FIG. 6 is an enlarged fragmentary sectional view taken along the line 6—6 of FIG. 5.

Elliptical member 56 has a major apex 61 with a radial slot 62. A flat vane and seal assembly 63 is slidably disposed in slot 62 and located in sliding sealing engagement with the side wall surfaces of ceramic coatings 30 and 31 and the elliptical surface 41 of ceramic coating 27A. As shown in FIGS. 3, 5, and 6, rotor vane and seal assembly 63 has a pair of generally triangular vane segments 164 and 166 slidably mounted on each other along a diagonal line. Vane segment 164 has a generally flat side 167 located in sliding engagement with ceramic coating 30 and a transverse top edge 168 spaced a short distance below elliptical surface 41 of body 27. As shown in FIG. 6, vane segment 164 has a diagonal tongue 169 located in a groove 171 in vane segment 166. The tongue and groove structure allow vane segments 164 and 166 to move in opposite directions to retain the side walls 167 and 172 in sliding engagement with the adjacent ceramic coatings 30 and 31 and perimeter seals 55 in sealing engagement with coatings 30 and 31.

Figure 8:
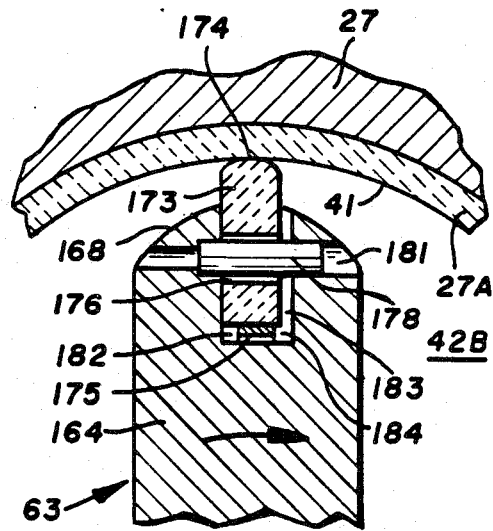
FIG. 8 is an enlarged sectional view taken along the line 8—8 of FIG. 5.

A generally flat blade-like seal member 173 of ceramic material or other materials is located in a slot 182 in the upper or top edge of vane segment 164. As shown in FIG. 8, seal member 173 has a convex-shaped outer edge 174 located in sliding sealing engagement with the inside elliptical surface 41 of ceramic coating 27A. A sine curved spring 175 biases member 173 into engagement with coating 27A. Seal member 173 has a pair of circumferentially directed holes 176 and 177 accommodating pins 178 and 179 for holding seal member 173 in moving assembled relation with vane segment 164. As shown in FIG. 8, hole 176 is slightly larger than pin 178 allowing seal member 173 to have limited radial movement relative to vane segment 164. Seal member 173 has a width slightly smaller than the width of slot 182. This allows seal member 173 to have limited circumferential movement in slot 182. As shown in FIG. 8, seal member 173 has been moved to the left in slot 182. A passage 183 between seal member 173 and segment 164 allows compressed gas in compression chamber 42B to flow through passage 183 into a base chamber 184 under seal member 173. The pressure of the gas in chamber 184 forces seal member 173 to move radially and retains outer edge 174 in sliding sealing engagement with the elliptical surface 41. As shown in FIG. 8, a pin 178 is located generally normal to the radial line of vane segment 164. Pin 178 is located within a hole 181 in the upper end of vane segment 164. The outlet end of hole 181 has a smaller diameter than the inlet end to prevent pin 178 from moving through hole 181.

Figure 7:
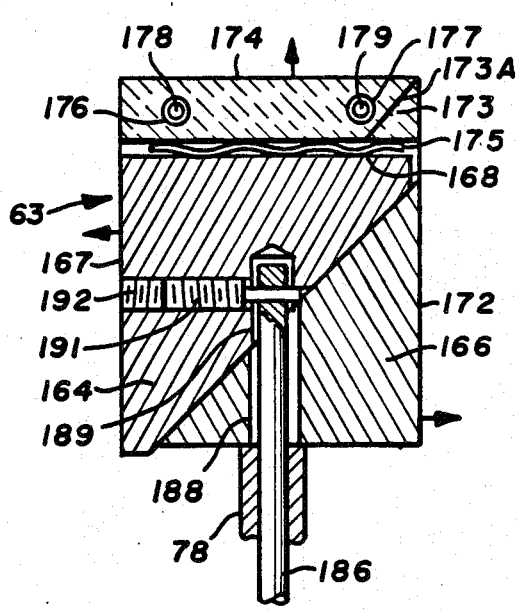
FIG. 7 is an enlarged sectional view taken along the line 7—7 of FIG. 4.

As shown in FIGS. 5 and 7, a radial rod 186 has an inner end connected to cam follower rod 77 with a pin and set screw assembly 187. Assembly 187 is threaded into the right end of rod 77 and engages rod 186. Rod 186 extends through tubular member 78 into holes 188 and 189 in vane segments 166 and 164. A pin and screw assembly 191 located in a threaded bore in vane segment 164 has a forward rod end located in a hole in the upper end of rod 186 to secure rod 186 to vane segment 164. Radial holes 188 and 189 are larger than rods 186 in diameter to allow the vane segments 164 and 166 to move relative to each other along the diagonal tongue and groove structure 169, 171 to allow for expansion of the overall width of vane 63.

As shown in FIG. 5, the lower end of tubular member 78 extends through a hole 193 in rotor body 56 and engages a biasing means shown as a plurality of Bellville washers 194. The upper end of tubular member 78 is in engagement with the bottom of vane segment 166. Biasing means 194 establishes a biasing force on the vane segments 164 and 166 to retain them in sliding sealing engagement with the inside surfaces of the ceramic coatings 30 and 31. Member 56 has a second major apex 66 located diametrically opposite apex 61. Apex 66 has a radial slot 67 accommodating a generally flat vane and vane and seal assembly 68. Vane and seal assembly 68 has a seal member 69 located in sliding sealing relation with elliptical inside surface 41. Vane and seal assembly 68 is identical in structure and function as vane and seal assembly 63.

Figure 9:
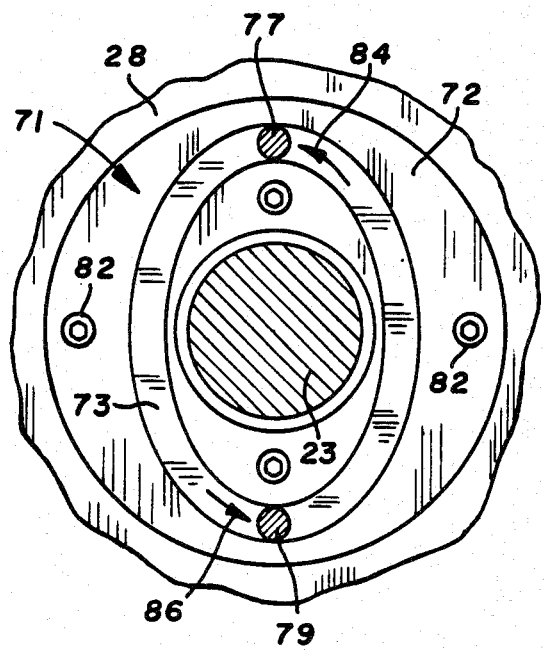
FIG. 9 is an enlarged sectional view taken along the line 9—9 of FIG. 3.
Figure 10:
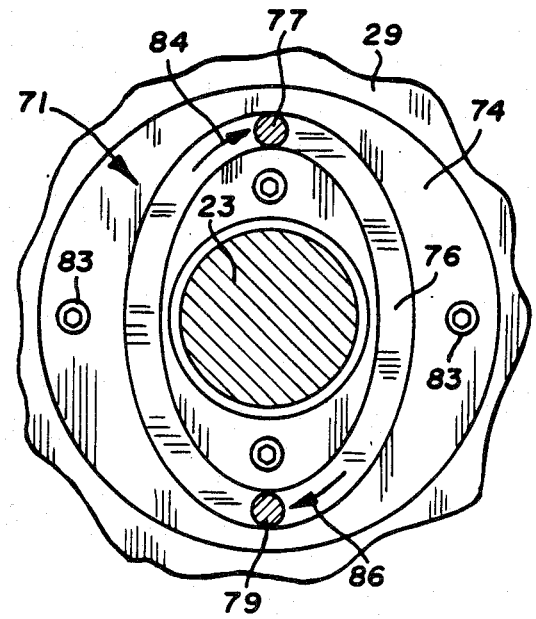
FIG. 10 is a sectional view taken along the line 10—10 of FIG. 3.

Vane and seal assemblies 63 and 68 reciprocate in slots 62 and 67, respectively, in response to rotation of member 56, as shown by the arrow 157 in FIG. 4. Vane and seal assemblies 63 and 68 are positively controlled by a first cam assembly indicated generally at 71 in FIGS. 3, 9, and 10. Cam assembly 71 comprises a first generally flat ring 72 located within a circular recess inside of end plate 28. A plurality of bolts 82 secure ring 72 to end plate 28. Ring 72 has a non-circular oval track 73 having a major and minor axes of inside wall 41. A second generally flat ring 74 is mounted on an inside recess in end plate 29. A plurality of bolts 83 secure ring 74 to end plate 29. Ring 74 has a non-circular oval track 76 having a size and shape that duplicates track 73. As shown in FIG. 3, tracks 73 and 76 face each other and accommodate opposite ends or followers of a cam follower rod 77. The mid-portion of rod 77 is secured to a radial stem 186 operatively connected to the inner end of vane segment 166. A second rod 79 has opposite ends or followers located in tracks 73 and 76 and an intermediate portion secured to a radial stem 81. Stem 81 is connected to the inner end of vane and seal assembly 68. As shown in FIGS. 9 and 10, the follower ends of rods 77 and 79 are located in diametrically opposite portions of cam tracks 73 and 76. The opposite ends of rods 77 and 79 can accommodate rotatable sleeves or roller bearings located in tracks 73 and 76. On rotation of rotor 53, the ends of rods 77 and 79 move along tracks 73 and 76 in the direction of the arrows 84 and 86, as shown in FIGS. 9 and 10. Since cam tracks 73 and 76 are oval in shape and rotor 53 rotates about an axis, the vane and seal assemblies 63 and 68 move radially with respect to rotor member 56 and thereby maintain the outer ends 174 of seal member 173 in contiguous sliding sealing relation with the elliptical inside wall 41 of body 27. The sides of vane segments 164 and 166 are generally flat and located in surface engagement with the inside ceramic coatings 30 and 31 of end plates 28 and 29 whereby vane and seal assemblies 63 and 68 and rotor member 57 move and compress air during rotation of rotor 53.

As shown in FIGS. 4, 11, 12, and 15, a pair of housing vane and seal assemblies 87 and 91 are located along the minor axis of inside wall 41. Vane and seal assemblies 87 and 91 are aligned with each other and located in the minor axis of the elliptical inside wall 41 between the intake and exhaust ports 43, 47, and 44, 46. Vane and seal assembly 87 is located in a generally rectangular slot 89 in body 27 and moves in slot 89 in response to rotation of rotor member. The second vane and seal assembly 91 is located in a generally rectangular slot 93 in body 27. Vane and assemblies 87 and 91 are identical in structure and function to maintain the sealing relation with the outside elliptical surface 57 of rotor 56 and form barriers between the intake and exhaust ports.

Figure 15:
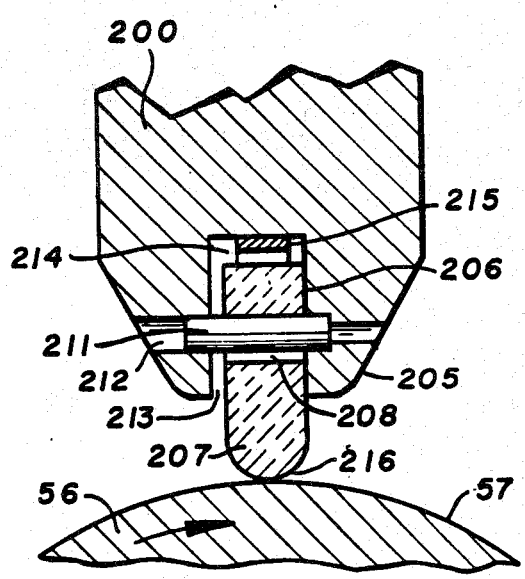
FIG. 15 is an enlarged sectional view taken along line 15—15 of FIG. 12.

The following description is limited to the vane and seal assembly 87 and the motion transmitting structure, including slack adjuster, for controlling the radial movement of the vane and seal assembly relative to housing 27. Referring to FIGS. 11, 12, and 15, vane and seal assembly 87 has a pair of triangular vane segments 200 and 201 slidably associated with engagement with each other along a bias line 202. Vane segment 200 has a generally flat side 203 located in sliding sealing engagement with the ceramic coating 30. The vane segments 200 and 201 are slidably joined together with a tongue and groove structure 204, as shown in FIG. 13. Returning to FIG. 15, vane segment 200 has a transverse slot 206. A generally flat seal member 207 is retained in slot 206 with a pair of pins 211. Pins 211 extend through hole 208 and hole 209 in seal member 207. As shown in FIG. 15, pin 211 is located in a hole 212 in inside edge 205. The outlet end of hole 212 has a smaller diameter than the inlet end to prevent pin 212 from moving through hole 212. Holes 208 and 209 are slightly larger than pins 207 to allow seal member 207 to be moved radially inwardly into engagement with the elliptical outer surface 57 of rotor 56 with a spring 215. As shown in FIG. 15, seal member 207 has a width smaller than the thickness of slot 206, thereby providing a passage 213 leading to a base chamber 214. In use, gas under pressure flows through passage 213 into chamber 214 and biases seal member 207 radially inwardly into engagement with rotor surface 57. The seal member 207 has a convex curve transverse face 216 that is spring biased with a leaf spring 215 into sliding sealing relation with elliptical rotor surface 57.

Returning to FIG. 12, vane segment 201 has a generally flat side 217 located in sliding sealing engagement with the ceramic coating 31. In use, vane segments 200 and 201 slide along the bias line 202 to hold the surface 203 and 217 in engagement with the ceramic coatings 30 and 31.

Figure 17:
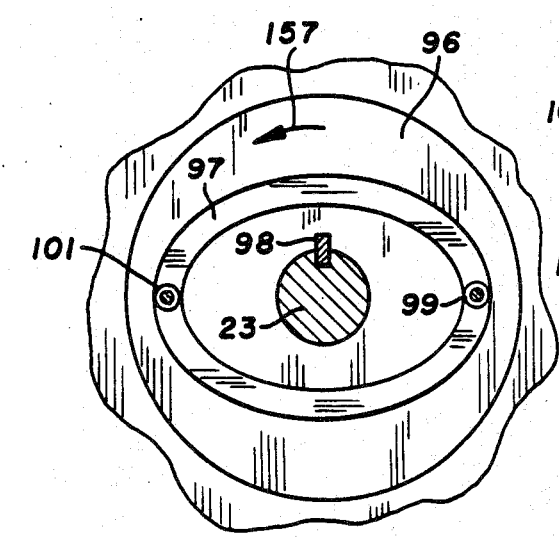
FIG. 17 is an enlarged sectional view taken along line 17—17 of FIG. 11.
Figure 18:
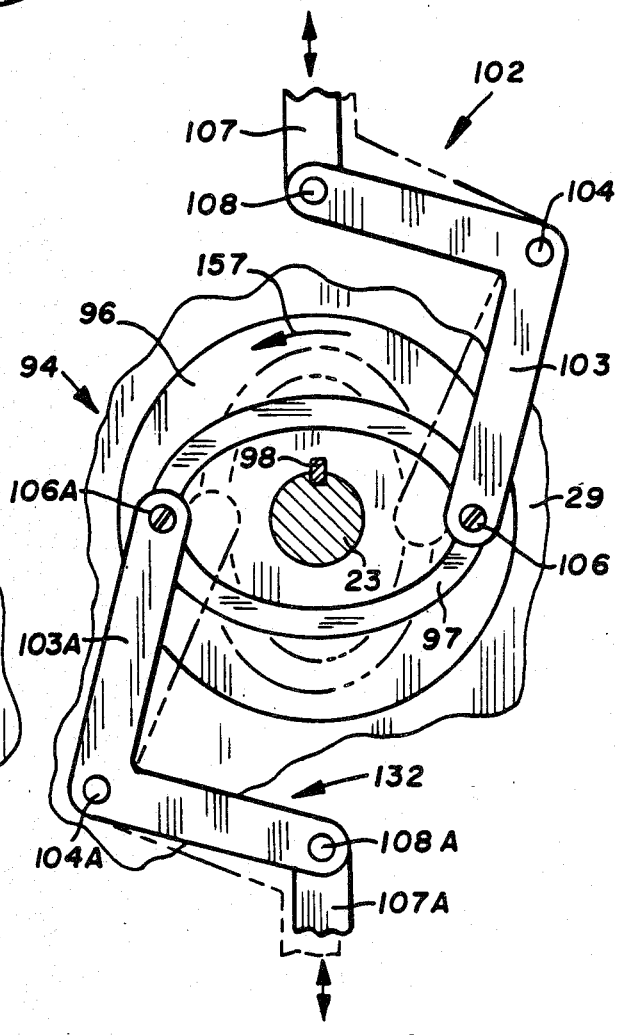
FIG. 18 is an enlarged sectional view taken along line 18—18 of FIG. 11.

A second cam assembly indicated generally at 94 in FIGS. 11 and 18 functions to control the movement of the housing vane and seal assemblies 87 and 91, shown in FIGS. 4 and 11, in slots 89 and 93, respectively, and maintain the vane and seal assemblies 87 and 91 in sliding sealing relation with respect to the elliptical outer surface 57 of rotor body 56 and ceramic coatings 30 and 31 during rotation thereof. Second cam assembly 94 comprises a ring 96 secured to shaft 23 with a key 98. Ring 96 can be secured to a flange integral with shaft 23. Ring 96 has an outwardly directed oval cam follower track 97. As shown in FIGS. 17 and 18, track 97 has a generally horizontal major axis and a vertical minor axis. The major and minor axes of track 97 are aligned with the major and minor axes of rotor 56. A pair of cam followers 99 and 101 are located in opposite portions of track 97. A first lever and link assembly indicated generally at 102 is operatively connected to cam follower 99 and vane and seal assembly 87. Assembly 102 comprises a bell crank 103 pivotally connected with a pivot member 104 to end plate 29. A fastener 106, such as a bolt, connects an end of bell crank 102, to cam follower 99. As shown in FIGS. 11 and 12, the opposite end of bell crank 102 is connected to an upwardly directed link or rod 107 with a pivot pin 108. Returning to FIG. 11, rod 107 extends upwardly through a passage 109 in end plate 29 and is pivotally connected to a rocker arm 111 with a connector block 112. Connector block 112 has a slot accommodating the mid-portion of lever 111, as shown in FIG. 12. A pin 113 pivotally connects lever 111 to block 112. The lower end of block 112 extends through a hole 115 in a frame 117 and is pivotally connected to the upper end of rod 107 with a pin 114. Block 112 is a cylinder that reciprocates in an upright passage in frame 117. One end of lever 111 is pivotally connected to a fulcrum block 116 with a pin 118. Block 116 has a slot 121 accommodating the fulcrum end of lever 111. As shown in FIG. 14, block 116 is slidably located within an upright cylindrical bore 122 in frame 117 allowing for the course adjustment of the cam follower control linkage. The upper end of block 116 is attached to a threaded bolt 123. Bolt 123 is threaded through a passage in frame 117 and accommodates a locking nut 124. Adjustment of bolt 123 will selectively raise and lower fulcrum pivot pin 118 thereby adjusting the clearance or gap of seal member 207 with respect to the elliptical outside surface 57 of rotor member 56. Referring to FIG. 12, an upright cylindrical rod 126 extends upwardly through a hole 127 in body 27 and terminates in a bifurcated upper end 128. A pin 129 pivotally connects link 111 to bifurcated end 128. An upwardly projected cylindrical projection 130 is slidably accommodated in a cylindrical bore 131 and controls the movement of rod 126. The inner end of rod 126 extends through a pair of holes 221 and 222 in vane segments 201 and 200. Vane segments 200 has a lateral threaded bore 223 accommodating a pin set and screw assembly 224. The forward end of assembly 224 extends through a hole in the lower inner end of rod 126 to secure the rod to the vane segment 200. Holes 221 and 222 are slightly larger than the diameter of the rod 126 to allow vane segments 200 and 201 to move in lateral opposite directions into sealing engagement with the ceramic coatings 30 and 31.

An automatic vane adjusting mechanism or slack adjuster indicated generally at 226 is used to maintain the seal surfaces 203 and 217 in sliding sealing engagement with the ceramic coatings 30 and 31 during operation of the rotary device. The slack adjuster 226 has a sleeve 227 located about rod 126. The lower end of sleeve 227 engages vane segment 201. The upper end of sleeve 227 has an upwardly diverging funnel-shaped head 228 surrounding a pocket 229. A cylindrical lock ring 231 located in pocket 229 is positioned in tight frictional engagement with the rod 126.

Figure 16:
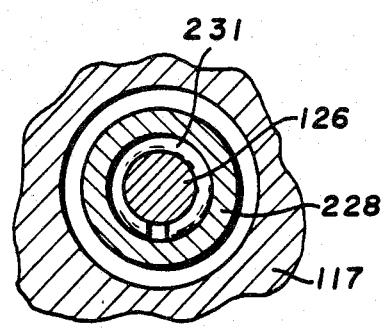
FIG. 16 is an enlarged sectional view taken along line 16—16 of FIG. 12.

As shown in FIG. 16, lock ring 231 is a split circular ring having an inside diameter located in tight frictional engagement with the outside cylindrical surface of rod 126. A cylindrical collar 232 is located above lock ring 231. Collar 232 is slidably positioned on rod 126 and has a lower end in engagement with lock ring 231. The upper end of collar 232 located in engagement with biasing means 233 spaces collar 232 from the head 128. Biasing means 233 comprises a plurality of Bellville washers that function to bias collar 232 into engagement with locking ring 231.

In use, slack adjuster 226 functions to maintain the vane segments 200 and 201 in sliding sealing engagement with ceramic coatings 30 and 31. As the vane segments and seal member wear, slack adjuster 226 spreads the vane and seal assembly 87 toward the end plates 28 and 29 to compensate for the wear. Biasing means 223 forces lock ring 231 into engagement with funnel-shaped head 228. Sleeve 227, being in engagement with vane segment 201, forces segment 201 in a downward direction. The tongue and groove arrangement between segments 200 and 201 cause segments 200 and 201 to move laterally in opposite directions. Split lock ring 231 prevents sleeve 227 from moving upwardly away from vane segment 202 so that vane segments 200 or 201 are retained in their adjusted positions.

Vane and seal assembly 91 is identical in structure and function to the vane and seal assembly 87. The power transmitting linkage 132 connecting vane and seal assembly 91 to cam plate 96 is identical to the power transmitting linkage, including slack adjuster 226, as shown in FIG. 12. The structure of lever and link assembly 132 that corresponds to linkage 102 has the same reference numbers with the suffix A. The slack adjuster is operable to automatically adjust the sliding sealing relationship between the vane segments of vane and seal assembly 91 and ceramic coatings 30 and 31.

In use, on rotation of shaft 23 in the direction of arrow 156, shown in FIGS. 17 and 18, shaft 23 rotates ring 96. Cam followers 99 and 101 follow the moving track 97 and pivot the bell cranks 103 and 133, as shown in broken lines in FIG. 18. This causes links 107 and 137 to reciprocate. The reciprocating motion of links 103 and 133 is transferred via levers 111 and 111A to stems 126 and 126A, thereby reciprocating vane and seal assemblies 87 and 91 in a manner to maintain their seal members 207 in close sealing relation with the outer elliptical surface 57 of rotor member 56.

Referring to FIGS. 1 and 4, there is shown valve and ignition assemblies 300 and 301 for igniting the fuel and controlling the flow of burning fuel to expansion chambers 42A and 42C of the engine. The valve and ignition assemblies 300 and 301 concurrently operate to sequentially open and close the intake ports 43 and 44. The valve and ignition assemblies support igniters that produce sparks that ignite the fuel in the valve and ignition assemblies. During the intake episode of the engine, the ports 43 and 44 are opening allowing the burning fuel to flow into the expansion chambers 42A and 42C. The burning fuel and expanding gases in chambers 42A and 42C cause rotor 53 to rotate thereby turn shaft 28.

The air and fuel mixture is supplied to the valve and ignition assemblies 300 and 301 by source of air under pressure, such as an air compressor. The air compressor operates to continuously introduce air under pressure to the valve and ignition assemblies. Fuel injectors or one or more carburetors are used to supply hydrocarbon fuel, such as gasoline, alcohol, or a mixture of gasoline and alcohol, to the air moving into the air compressor. The fuel can be propane gas and like combustible gases.

The air compressor can be drivably coupled to the output shaft 23 of the engine. A suitable compressor is disclosed in co-pending U.S. patent application Ser. No. 477,448. The amount of air supplied to the valve and ignition assemblies 300 and 301 is proportional to a speed of the engine. The operation of the air compressor can be sequenced with the air requirements of the engine. On completion of the introduction of compressed fuel and air mixture in the valve and ignition assemblies 300 and 301, the fuel is ignited and burns in the valve assemblies. The burning fuel is allowed to flow and expand in expansion chambers 42A and 42C of the engine causing the rotor 53 to rotate in the direction of the arrow 157 as shown in FIG. 4.

Valve and ignition assembly 301 is identical to assembly 300. The parts of assembly 301 that correspond to the parts of assembly 300 have the same reference numbers with the suffix A. The following description is directed to assembly 300. Engine housing 27 and end plates 28 and 29 have a common bore 302 open to the intake port 43. Bore 302 extends parallel to the axis of rotation of shaft 23. A sleeve 303 is located in bore 302. Sleeve 303 has an inlet opening 304 for receiving an air and fuel mixture from a source of air under pressure, such as an air compressor, as indicated by arrow 305. Longitudinally spaced from inlet opening 304 is an outlet opening 306 aligned with the intake port 43. A flange 308 secures sleeve 303 to the housing end plate 29. A plurality of bolts 309 attach flange 308 to plate 29. The entire valve assembly can be removed from the housing by releasing the bolts 309 and withdrawing sleeve 303 from bore 302.

A rotatably valving member 311 is located within sleeve 303. As shwon in FIG. 21, valving member 311 has a longitudinal central passage 312 having an inlet end 313 aligned with opening 304 and an outlet end 314 aligned with intake port 43. The ends 313 and 314 are open in diametric opposite directions so that when inlet opening 304 is closed outlet opening 306 and port 43 are open as shown in FIG. 21. When the valving member 311 is rotated 180 degrees the inlet end 313 is open to the opening 304 allowing an air fuel mixture to be introduced into the passage 312. The intake port 43 is closed. Valving member 311 has an outer end or neck 316 rotatably supported in a sleeve bearing 317. An annular member 318 secured to sleeve 303 with bolts 319 retains bearing 317 and valving member 311 in rotatable assemblied relation with sleeve 303. A bearing 320 supports the inner end 327 of valving member 311. A gear 321 mounted on the outer end of valving member 311 is used to drivably connect valving member 311 to shaft 23 so that valving member 311 will rotate in a timed relation with respect to rotation of rotor 53. Other drive structures, such as a belt or synchronous motor can be used to rotate valving member 311 in a timed relation with the rotation of rotor 53.

Rotatable valving member has a first C-shaped segment seal 322 located in alignment with inlet opening 304. Seal 322 is in surface sealing engagement with the inside of sleeve 303 to minimize leakage of high pressure gas back to inlet opening 304. A second C-shaped segment seal 323 is located in alignment with the intake port 43. Seal 323 is located in surface sealing engagement with the inside surface of sleeve 303 to prevent the intake gases from flowing into the expansion chambers.

A cup-shaped holder 324 is secured to end plate 328 with a plurality of bolts 326. The holder 324 fits into bore 302 and is in longitudinal alignment with sleeve 303. An igniter 328, such as a spark plug, is threaded into the inner end 327 of holder 324. The igniter 328 has a spark generation means or ignition contacts 331 located in the end of passage 312 adjacent the intake port 43. The inner end 329 of valving member 311 telescopes over the end 327 of the holder 324 and is supported on sleeve bearing 320.

Figure 19:
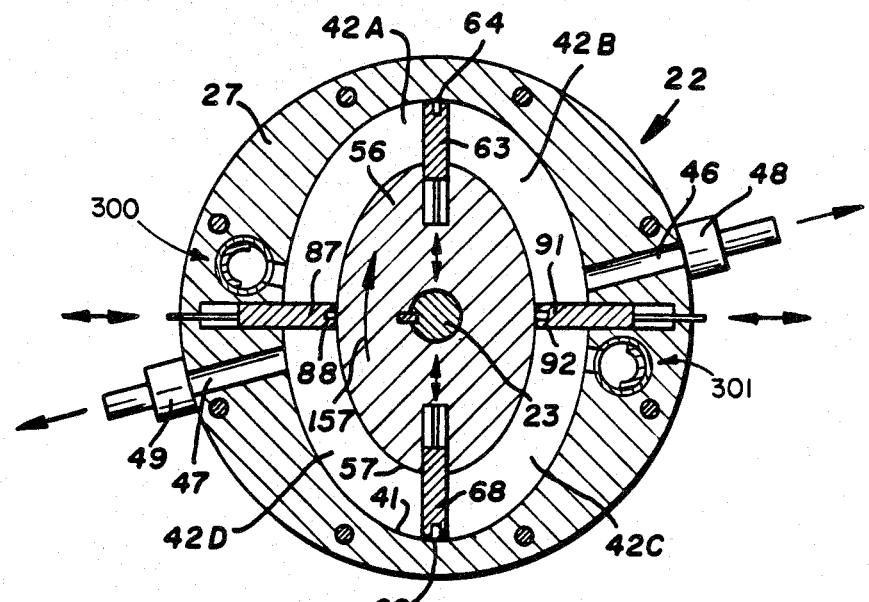
FIG. 19 is a diagrammatic view of the rotary internal combustion engine with the major axis of the elliptical rotor located along the major axis of the elliptical chamber.
Figure 20:
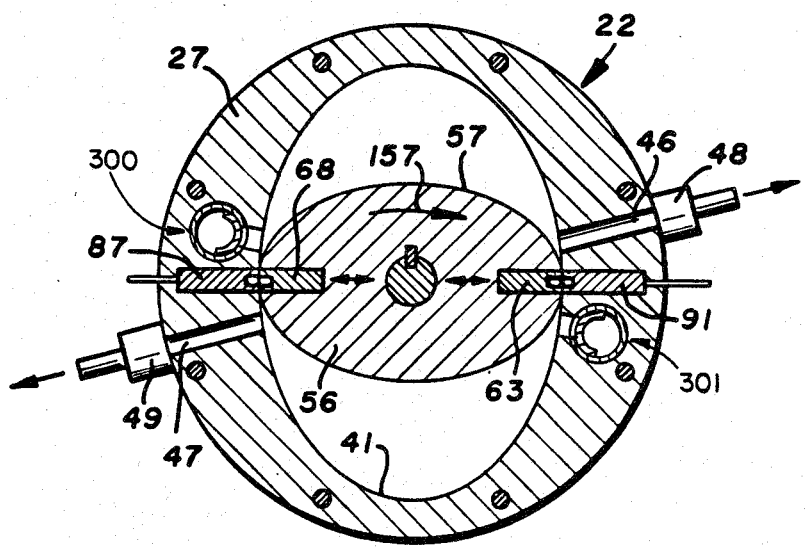
FIG. 20 is a diagrammatic view of the rotary internal combustion engine with the major axis of the elliptical rotor located along the minor axis of the elliptical chamber.

Referring to FIGS. 4, 19, and 20, in operation, air under pressure is simultaneously supplied to the valve and ignition assembly 300 and 301. The air has been supplied with fuel such as hydrocarbon fuel, propane, and the like. The source of the air can be an air compressor coupled to the shaft 23 of the engine. Other air pressure sources can be used. Fuel in introduced into the air flowing to the air compressor to provide a combustible air and fuel mixture at a desired air/fuel ratio, i.e. 15 to 1. This air/fuel ratio can be maintained constant for all engine speeds.

Rotor 53 is initially turned with a starter motor or hand crank (not shown). An ignition switch coupling a source of electric power, such as a battery, to an ignition control circuit (not shown), is turned on to supply electrical power to the igniters 328 and 328A. The electrical control circuit operates in timed relation with the rotation of rotor 53 to supply electric power to the spark generator contacts of the igniters 328 and 328A thereby igniting the air and fuel mixture in the valve and ignition assemblies 300 and 301.

The valving members 311 and 311A are rotated in timed relation with rotation of rotor 53 to positions as shown in FIGS. 4, 19, and 21 to allow the air and fuel mixture to flow into expansion chambers 42A and 42C. This air and fuel mixture has been initially ignited and partially burned in the passages 312 and 312A of the valving members 311 and 311A. The burning and expanding fuel flows from the valving member passages into expansion chambers 42A and 42C. The fuel continues to burn and expand in chambers 42A and 42C causing rotor 53 to rotate in the direction of the arrow 157 as shown in FIG. 4. The engine has two power cycles in each expansion chamber 42A and 42C for each revolution of rotor 53. Concurrently with the power cycles, the exhaust gases are expelled from the engine via the exhaust ports 46 and 47.

Vanes 63 and 68 are maintained in sealing engagement with the elliptical inside wall 41 of housing 27 and force the exhaust gases from the opposite chambers 42B and 42D. Housing vane and seal assemblies 87 and 91 are maintained in sealing relation with the outer elliptical surface 57 of rotor 53 by operation of second cam assembly 94 to separate intake ports 43 and 44 from exhaust ports 46 and 47 so that the exhaust gases in chambers 42B and 42D are forced out through ports 46 and 47. As shown in FIG. 20, vane and seal assemblies 63 and 68 are in their in or retracted positions and vane and seal assemblies 87 and 91 are in their in position, so that they clear each other when the major axis of rotor 53 coincides with the minor axis of the elliptical surface 41.

While there has been shown and described a preferred embodiment of the rotary internal combustion engine of the invention, it is understood that changes in the structure, materials, arrangement of structures, valves and seal and the size of the structures can be made by those skilled in the art without departing from the invention. The invention is defined in the following claims.

The embodiments of the invention in which an exclusive property or privilege is defined are as follows:

1. A rotary internal combustion engine comprising: housing means having an inside surface surrounding chamber means for accommodating a compressed combustible air and fuel mixture, said housing means having intake port means and exhaust port means, means for directing a supply of an air and fuel mixture to said chamber means comprising a rotary valve member having a passage sequentially open to said chamber means and open to a supply of an air and fuel mixture under pressure, rotor means rotatably mounted on the housing means located within said chamber means, first vane means movably mounted on the rotor means, first means operable to move the first vane means to a contiguous sealing relation with said inside surface during rotation of the rotor means, second vane means movably mounted on the housing means to separate said intake port means from the exhaust port means, second means operable to move the second vane means to a contiguous sealing relation with said rotor means whereby on rotation of the rotor means an air and fuel mixture flows into the chamber means through said intake port means and exhaust gas is discharged from the chamber means through said exhaust port means, and means operabe to ignite the air and fuel mixture in said passage whereby the air and fuel mixture burns and expands in said chamber means causing the rotor means to rotate within the chamber means.

2. The engine of claim 1 wherein: said inside surface of the housing means has an elliptical shape.

3. The engine of claim 2 wherein: said rotor means has an outside elliptical surface located in said chamber means.

4. The engine of claim 2 wherein: said rotor means comprises an elliptical rotor having a major diameter substantially equal to the minor diameter of the elliptical inside surface of the housing means.

5. The engine of claim 4 wherein: said elliptical rotor means has opposite end sections located along the major axis of the rotor means, said first vane means comprising first vanes and second vanes movably mounted on said end sections of the rotor means.

6. The engine of claim 1 wherein: said first means includes means having a generally oval-shaped track means mounted on the housing means, cam follower means located in said track means, and means connecting the cam follower means with the first vane means whereby movement of the first vane means relative to the rotor means is determined by the shape of the track means.

7. The engine of claim 6 wherein: said housing means has end plates, said track means being secured to said end plates.

8. The engine of claim 6 wherein: the inside surface of the housing means has a generally elliptical shape with a major axis and a minor axis, and the track means has a major axis and a minor axis aligned with the major axis and minor axis of the inside surface of the housing means.

9. The engine of claim 1 wherein: said inside surface of the housing means has an elliptical shape, said first means includes means having a generally oval-shaped track means mounted on the housing means, cam follower means located in said track means, and means connecting the cam follower means to the first vane means whereby the movement of the first vane means relative to the rotor means is determined by the shape of the track means, said track means having major and minor axes that are aligned with the major and minor axes of the elliptical-shaped inside surface of the housing means.

10. The engine of claim 9 wherein: the rotor means comprises an elliptical rotor, and the second means includes means mounted on the shaft means having generally oval-shaped second track means, second cam follower means cooperating with said second track means, and motion transmitting means connecting the second follower means to the movable second vane means whereby rotation of said shaft means rotates the track means moving the second cam means and motion transmitting means to effect movement of the second vane means relative to the rotor means.

11. The engine of claim 10 wherein: said motion transmitting means includes a lever, link means operatively connecting the lever to said second cam means, means connecting the lever to said second vane means, and fulcrum means pivotally mounting the lever on said housing means.

12. The engine of claim 11 including: means to adjust the position of the fulcrum means and thereby adjust the contiguous sealing relation between said second seal means and the rotor means.

13. The engine of claim 10 wherein: the second track means has a major axis and a minor axis aligned with the major axis and minor axis of the elliptical rotor.

14. The engine of claim 1 wherein: said second cam means includes means drivably associated with the rotor means having generally oval track means, cam follower means cooperating with said track means, and motion transmitting means connecting the cam follower means to the movable second vane means whereby rotation of said rotor means rotates the track means moving the cam follower means and motion transmitting means to effect movement of the second vane relative to the rotor means to maintain the contiguous sealing relation therebetween.

15. The engine of claim 14 wherein: said motion transmitting means includes a lever, link means operatively connecting the lever to said second cam means, means connecting the lever to said second cam means, means connecting the lever to said second vane means, and fulcrum means pivotally mounting the lever on said housing means.

16. The engine of claim 15 including: means to adjust the position of the fulcrum means and thereby adjust the contiguous sealing relation between said second vane means and the rotor means.

17. The engine of claim 1 wherein: said housing means has an elliptical inside surface surrounding an elliptical-shaped chamber means for accommodating fluid, said fluid intake port means and fluid exhaust port means being located in said housing and open to said chamber means adjacent the minor axis of the elliptical chamber means, said second vane means being movably mounted on the housing means between said intake port means and said exhaust port means.

18. The engine of claim 17 wherein: said rotor means comprises an elliptical-shaped rotor having a length along the major axis thereof substantially equal to the minor axis of the elliptical chamber means.

19. A rotary internal combustion engine comprising: housing means having an elliptical inside surface surrounding an elliptical chamber means, gas intake port means open to the chamber means adjacent the minor axis thereof, and gas exhaust port means open to the chamber means adjacent the minor axis thereof, said exhaust port means being separated from the gas intake port means, an elliptical rotor means located in said chamber means, means for directing a supply of an air and fuel mixture to said chamber means comprising a rotary valve member having a passage sequentially open to said chamber means and open to a supply of an air and fuel mixture under pressure, said rotor means having a major axis opposite ends and an outer elliptical surface, shaft means secured to the rotor means rotatably mounted on the housing means, first vane movably mounted on the major axis opposite ends of the rotor means, said first vane means having outer ends locatable in sealing relation relative to said inside surface of the housing means, first means operably connected to the first vane means for reciprocating the first vane means relative to the rotor means during rotation of the rotor means in a manner to maintain said outer ends in said sealing relation relative to said inside surface of the housing means, second vane means movably mounted on the housing means between the intake port means and exhaust port means extend into the chamber, the second vane means have inner ends locatable in sealing relation relative to the outer elliptical surface of the rotor means, second means connected to the second vane means operable to reciprocate the second vane means to said sealing relation with said outer elliptical surface of the rotor means during rotation of the rotor means, and means operable to ignite the air and fuel mixture in said passage whereby the air and fuel mixture burns and expands in said chamber means causing the rotor means to rotate within the chamber means.

20. The engine of claim 19 wherein: said first means includes means having a generally oval-shaped track means mounted on the housing means, cam follower means located in said track means, and means connecting the cam follower means with the first vane means whereby the movement of the first vane means relative to the rotor means is determined by the shape of the track means.

21. The engine of claim 20 wherein: said housing means has end plates, said track means being secured to said end plates.

22. The engine of claim 20 wherein: said track means has a major axis and a minor axis that are aligned with the major axis and minor axis of the elliptical chamber.

23. The engine of claim 19 wherein: the second means includes means mounted on the shaft means having generally oval-shaped track means, cam follower means cooperating with said track means, and motion transmitting means connecting the cam follower means to the movable second vane means whereby rotation of said shaft means rotates the track means moving the second cam follower means and motion transmitting means to effect movement of the second vane means relative to the rotor means.

24. The engine of claim 23 wherein: said motion transmitting means includes a lever, link means operatively connecting the lever to said second cam means, means connecting the lever to said second vane means, and fulcrum means pivotally mounting the lever on said housing means.

25. The engine of claim 24 including: means to adjust the position of the fulcrum means and thereby adjust the sealing relation between said second vane means and the outer face of the elliptical rotor means.

26. The engine of claim 19 wherein: said first means includes means having a generally oval-shaped first track means mounted on the housing means, first cam follower means located in said first track means, and means connecting the first cam follower means with said first vane means whereby the movement of the first vane means relative to the rotor means is determined by the shape of the first track means, said second cam means includes means drivably associated with the shaft means having generally oval-shaped second track means, second cam follower means cooperating with said second track means, and motion transmitting means connecting the second cam follower means to said second vane means whereby rotation of said shaft means rotates the second track means moving the second cam follower means and motion transmitting means to effect movement of the second vane means relative to the rotor means and retain said sealing relation between the outer ends of the second vane means and the rotor means.

27. The engine of claim 26 wherein: said first track means has a major axis and a minor axis that are aligned with the major axis and minor axis of the elliptical-shaped chamber means, and said second track means has a major and a minor axis that are aligned with the major axis and minor axis of the elliptical rotor means.

28. The engine of claim 19 wherein: the outer ends of each first vane includes a seal member movably mounted on the outer end of each first vane, and means to bias the seal member into engagement with the elliptical surface of the housing means.

29. The engine of claim 19 wherein: the inner end of each second vane includes a seal member movably mounted on the inner end of each second vane, and means to bias the seal member into engagement with the elliptical surface of the rotor means.

30. The engine of claim 19 wherein: the outer end of each first vane includes a first seal member movably mounted on the outer end of each first vane, means to bias the first seal member into engagement with the elliptical surface of the housing means, said inner end of each second vane includes a second seal member movably mounted on the inner end of each second vane, and means to bias the second seal member into engagement with the elliptical surface of the rotor means.

31. A rotary internal combustion engine comprising: housing means having an inside elliptical surface surrounding chamber means for accommodating an air and fuel mixture, said housing means having intake port means and exhaust port means, means for directing a supply of an air and fuel mixture to said chamber means comprising rotatable valving means having a passage sequentially open to said chamber means and open to a supply of air and fuel mixture under pressure, rotor means rotatably mounted on the housing means located with said chamber means, said rotor means having an outside elliptical surface having a major dimension substantially equal to the minor dimension of the elliptical surface of the housing means, first vane means mounted on the rotor means, said rotor means having a pair of slots along the major dimension thereof, said first vane means comprising a pair of first vanes slidably located in said slots for reciprocal movement relative to the rotor means during rotation of the rotor means, each of said first vanes having first seal means on the outer ends thereof located in sealing relation with the inside surface of the housing means, first means operable to reciprocate the first vanes to maintain contiguous sealing relation of the first seal means with said inside surface during rotation of the rotor means, said first means including means having a generally oval-shaped first track means mounted on the housing means, said first track means having a major dimension that substantially coincides with the major dimension of the elliptical surface of the housing means, first cam follower means located in said first track means, and connected to the first vanes, means connecting the first cam follower means with the first vane means whereby reciprocal movement of the first vanes relative to the rotor means caused by the movement of the first cam follower means along the first track means maintains the first seal means in contiguous sealing relation with said elliptical surface of the housing means, second vane means movably mounted on the housing means to separate said intake port means from the exhaust port means, said second means comprising a pair of second vanes extended into the chamber along the minor dimension thereof, each of said second vanes having second seal means on the inner ends thereof located in sealing relation with the elliptical surface of the rotor means, second means operable to reciprocate the second vanes to maintain contiguous sealing relation of the second seal means with said surface of the rotor means whereby on rotation of the rotor means an air and fuel mixture flows into the chamber through said intake port means and exhaust gases are discharged from the chamber through said exhaust port means, said second means including means mounted on the shaft means having generally oval-shaped grooved second track means that follows the elliptical shape of the elliptical surface of the rotor means, second cam follower means located within the grooved second track means and cooperating with said second track means, motion transmitting means connecting the second follower means to the movable second vane means whereby rotation of said shaft means rotates the second track means moving the second cam means and motion transmitting means to effect reciprocal movement of the second vane means relative to the rotor means to maintain the second seal means in contiguous sealing relation with the elliptical surface of said rotor means, and means operable to ignite the air and fuel mixture in said passage whereby the air and fuel mixture burns and expands in said chamber means causing the rotor means to rotate with the chamber means.

32. The engine of claim 31 wherein: said fluid intake port means and fluid exhaust port means being located in said housing and open to said chamber means adjacent opposite sides of the minor axis of the elliptical chamber means, said second vanes being movably mounted on the housing means between said intake port means and said exhaust port means.

33. The engine of claim 31 wherein: the first seal means comprises a seal member movably mounted on the outer end of each first vane, and means to bias the seal member into engagement with the elliptical surface of the housing means.

34. The engine of claim 31 wherein: the second seal means comprises a seal member movably mounted on the inner end of each second vane, and means to bias the seal member into engagement with the elliptical surface of the rotor means.

35. The engine of claim 31 therein: the first seal means comprsies a first seal member movably mounted on the outer end of each first vane, means to bias the first seal member into engagement with the elliptical surface of the housing means, said second seal means comprising a second seal member movably mounted on the inner end of each second vane, and means to bias the second seal member into engagement with the elliptical surface of the rotor means.

36. A rotary internal combustion engine comprising: housing means having inside generally elliptical surface surrounding chamber for accommodating an air and fuel mixture, said housing means having intake port means and exhaust port means allowing the air and fuel mixture to flow into the chamber and exhaust gases to flow out of the chamber, means for directing a supply of an air and fuel mixture to said chamber comprising rotatable valving means having a passage sequentially open to said chamber means and open to a supply of air and fuel mixture under pressure, rotor means rotatably mounted on the housing means located in said chamber, said rotor means having an outside generally elliptical surface having a major dimension substantially equal to the minor dimension of the elliptical surface of the housing means, first vane means movably mounted on the rotor means for reciprocal movement toward and away from said inside elliptical surface during rotation of the rotor means, said first vane means having first seal means movably mounted on the outer ends thereof located in sealing relation with the inside elliptical surface of the housing means, means for biasing the first seal means into engagement with said inside elliptical surface, vane means movably mounted on the housing means to separate said intake port means from the exhaust port means, said second vane means having a second seal means movably mounted on the inner ends thereof and located in sealing relation with the outside elliptical surface of the rotor means, means to bias the second seal means into engagement with said inside elliptical surface, and second means operable to move the second vane means to maintain contiguous sealing relation of the second seal means with said outside elliptical surface of the rotor means whereby on rotation of the rotor means the air and fuel mixture flows into the chamber through said intake port means and exhaust gases are discharged from the chamber through said exhaust port means, and means operable to ignite the air and fuel mixture in said passage whereby the air and fuel mixture burns causing the rotor means to rotate within the chamber.

37. The engine of claim 36 wherein: said first means includes means having a generally oval-shaped first track means mounted on the housing means, said first track means having a major dimension that substantially coincides with the major dimension of the elliptical surface of the housing means, first cam follower means located in said first track means and connected to said first vane means, means connecting the first cam follower means with the first vane means whereby reciprocal movement of the first vane means relative to the rotor means maintains the first seal means in contiguous sealing relation with said inside elliptical surface of the housing means, said second means including means mounted on the shaft having generally oval-shaped second track means that follows the elliptical shape of the elliptical surface of the rotor means, second cam follower means cooperating with said second track means, and motion transmitting means connecting the second follower means to the movable second vane means whereby rotation of said shaft means rotates the second track means moving the second cam means and motion transmitting means to affect movement of the second vane means relative to the outside elliptical surface of the rotor means to maintain the second seal means in contiguous sealing relation with the outside elliptical surface of said rotor means.

38. The engine of claim 37 wherein: said motion transmitting means includes a lever, link means operatively connecting the lever to the second cam means, means connecting the lever to said second vane means, and fulcrum means pivotally mounting the lever on said housing means.

39. The engine of claim 38 including: means to adjust the position of the fulcrum means and thereby adjust the contiguous sealing relation between said second seal means and the outside elliptical surface of the rotor means.

40. The engine of claim 36 wherein: the first seal means comprises a seal member reciprocally mounted on the outer end of the first vane means, said biasing means engaging the seal member to bias the seal member into contiguous sealing relation with the inside elliptical surface of the housing means during rotation of the rotor.

41. The engine of claim 36 wherein: the second seal means comprises a seal member reciprocally mounted on the inner end of the second vane means, said means to bias the second seal means being engageable with the second seal member to bias the second seal member into contiguous sealing relation with the outside elliptical surface of the rotor means during rotation of the rotor means.

42. The engine of claim 36 wherein: the first seal means comprises a first seal member reciprocally mounted in the outer end of the first vane means, said means bias the first seal means being engageable with the first seal member to bias the first seal member in contiguous sealing relation with the inside elliptical surface of the housing means, said second seal means comprises a second seal member reciprocally mounted on the inner end of the second vane means, said means to bias the second seal means being engageable with the second seal member and operable to maintain the second seal member in contiguous sealing relation with the outside elliptical surface of the rotor means during rotation of the rotor means.

43. The engine of claim 36 wherein: said housing means has bore means to open to the intake port means, sleeve means having an opening aligned with said intake port means located in said bore means, said valving means being rotatably located within said sleeve means, and said means to ignite the air and fuel mixture having a spark generator means open to said passage.

44. The engine of claim 1 wherein: said housing means has bore means open to the intake port means, sleeve means having an opening aligned with the intake port means located in said bore means, said valving member being rotatably located within said sleeve means, and said means to ignite the air and fuel mixture having a spark generator means open to said passage.

* * * * *